United States Patent [19]
Johnson et al.

[11] Patent Number: 6,037,584
[45] Date of Patent: Mar. 14, 2000

[54] OPTICAL SCANNER INCLUDING EXPOSURE CONTROL

[75] Inventors: Craig Thomas Johnson, San Diego; Joseph Scott McCoy, San Marcos, both of Calif.

[73] Assignee: Hewlett-Packard Company, Palo Alto, Calif.

[21] Appl. No.: 09/074,835

[22] Filed: May 8, 1998

[51] Int. Cl.⁷ ...................................................... H01J 3/14
[52] U.S. Cl. .......................... 250/235; 250/234; 358/514; 358/412
[58] Field of Search ................................ 250/208.1, 234; 348/262, 265, 300; 358/412, 474, 514

[56] References Cited

U.S. PATENT DOCUMENTS 4,982,205  1/1991  Hasegawa ............................... 347/261
5,943,139  8/1999  Tang et al. ............................... 358/412

*Primary Examiner*—Edward P. Westin
*Assistant Examiner*—Glenn T Kinnear
*Attorney, Agent, or Firm*—Jerry R. Potts

[57] ABSTRACT

A scanner includes a photodetector, and encoder and an exposure control. For each line of pixels detected by the photodetector, the exposure control starts the exposure time and then stops the exposure time after a specified amount of relative motion has been detected. Thus, variations in the amount of relative motion cause inversely proportional variations in the exposure time to ensure that exposure time for each line of pixels corresponds to the same displacement. The exposure control can compensate for unavoidable position and velocity errors encountered in a dc motor drive and thereby allows a dc motor drive to be used in low cost commercial scanning products.

22 Claims, 7 Drawing Sheets

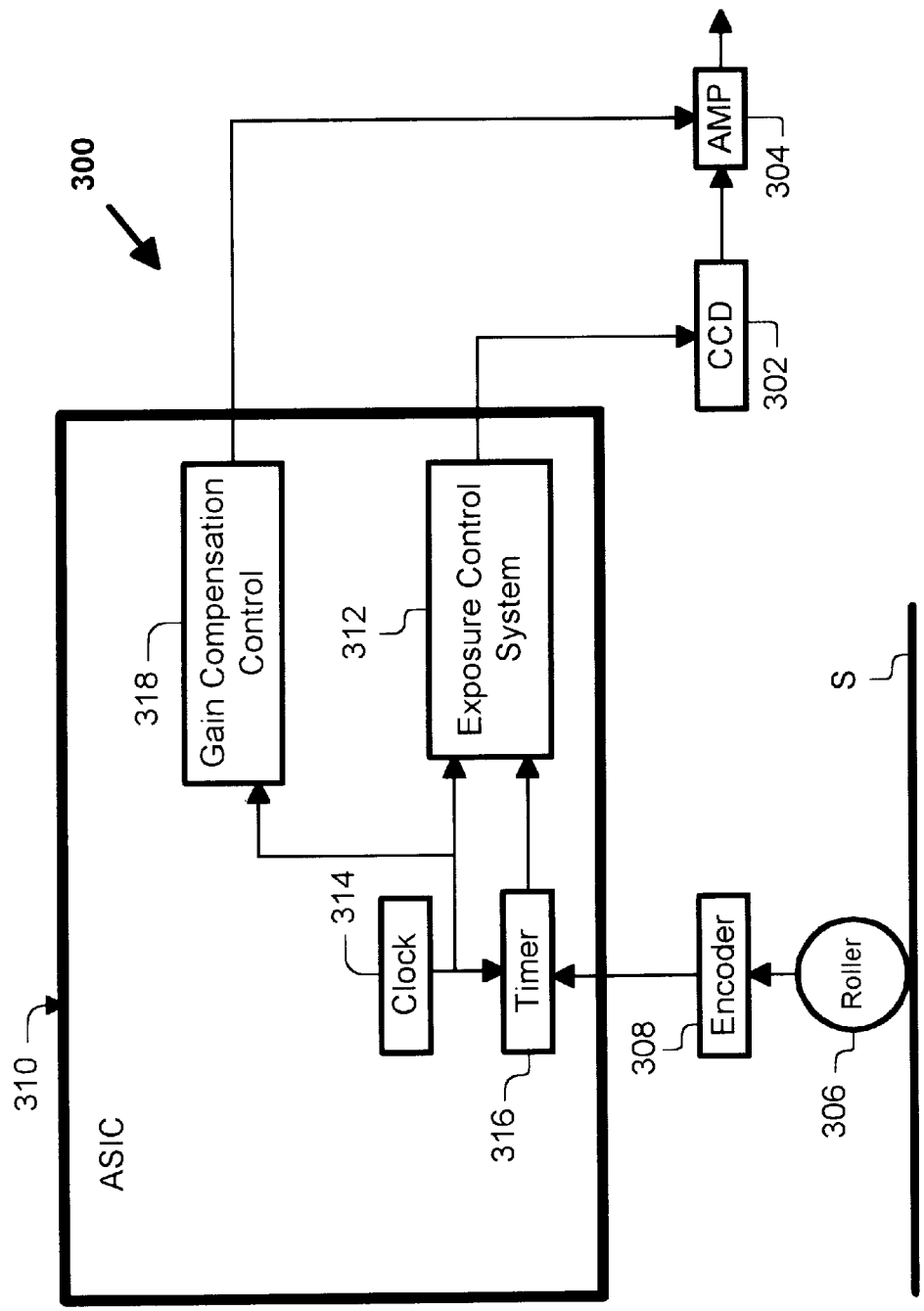

OPTICAL SCANNER INCLUDING EXPOSURE CONTROL

BACKGROUND OF THE INVENTION

The invention relates to imaging devices. More specifically, the invention relates to an exposure control for an optical scanner.

Desktop scanners typically use a step motor to move a charge coupled device ("CCD") across a sheet of paper or move a sheet of paper across the CCD. In a color copier or flatbed scanner, for instance, lines of pixels are generated as the CCD is moved over the sheet of paper. The CCD is moved at a constant velocity, and each line of pixels is given a constant exposure time. Therefore, the exact size of the pixels that make up a scanned image is a direct function of the motion accuracy of the drive system.

The step motor is controlled to a high positional accuracy, especially if scan stitching is performed. Two examples of scan stitching are as follows.

The first example involves color plane registration in a color scanner that collects red, green and blue information in a single pass. The CCD includes three rows of color photodiodes that are physically separated. A first row of photodioides detects the red information, a second row detects the green information, and a third row detects the blue information. The rows are physically separated on the CCD typically by $\frac{1}{150}$ to $\frac{8}{150}$ of an inch. After an image has been scanned, the information from each of the rows of photodiodes (that is, the color planes) are later realigned by electronics or software in increments of one pixel. Thus, the red color plane will later be shifted into alignment with the green color plane, and the blue color plane will later be shifted into alignment with the green color plane. Motion errors in between the rows of photodiodes and fractional pixel errors are difficult to correct after the image has been scanned. These residual position errors appear in the scanned image as "color fringes" around black-to-white edges.

The second example of stitch scanning involves stop/start repositioning of the CCD or paper sheet. Often the scanner will pause mid-scan because of a speed constraint such as memory being full, an I/O delay, a busy host computer or a slow print engine. If a speed constraint is encountered, the scanner stops scanning and waits for the constraint to clear. Then the CCD or paper is accelerated to scanning speed so that scanning can begin at the precise point where it had previously stopped. If the scanning does not begin at the precise point, or if the scanning speed has not been attained, position errors will appear in the image as discontinuities or "jaggies." Color fringes and jaggies become even more noticeable if the scanned image is enlarged or scan resolution is increased. Furthermore, color fringes and jaggies can severely reduce the accuracy of text recognition software, such as optical character recognition ("OCR") programs.

These two examples of scan stitching illustrate the need for positioning accuracy within 0.1 to 0.2 pixels. On a 1200 dpi scan, this requires an accuracy of 0.0001" (about two microns). However, inexpensive step motor drive systems used in commercial products such as flatbed scanners and color copiers are not capable of this level of accuracy.

There are other limitations associated with step motors. A step motor can be noisy, it has a limited range of speeds over which it can perform acceptably, and it consumes a lot of power. Additionally, motion of the step motor is inherently oscillatory because it is driven by discrete step inputs. The oscillatory motion can cause color fringes in scanners using three-channel RGB CCDs.

Scan motion accuracy is often limited by the finite step size. Even if the step motor is microstepped to improve resolution and reduce torque ripple, some motion errors are still inevitable.

An inexpensive step motor drive system does not have position or velocity feedback, so there is no way to know the true position of the CCD or whether the step motor has stalled. Therefore, the step motor is typically overdriven with a considerable amount of extra torque to satisfy the worst case load. Overdriving increases the size, cost and heat dissipation of the motor driver.

It would be desirable to replace the step motor with a dc motor. However, control of a dc motor has heretofore not been accurate enough to produce a quality image and meet the cost, size, weight, and power requirements of a low cost commercial scanning product such as a flatbed scanner, scrollfed scanner, color copier, fax machine or all-in-one multi-function product.

SUMMARY OF THE INVENTION

The invention can be regarded as an optical scanning system including a photodetector, an encoder and an exposure control. The photodetector includes at least one row of photodetector elements. Exposure time of the photodetector elements is stopped and started in response to a first signal. The encoder detects relative motion with respect to the detector. An output of the encoder provides a second signal indicating a characteristic (e.g., position or velocity) of the relative motion. The exposure control, in response to the second signal, generates the first signal to control the starting and stopping of the exposure time. For each line of pixels detected by the photodetector, the exposure control starts the exposure time and then stops the exposure time after a specified amount of relative motion has been detected. Thus, variations in the amount of relative motion cause inversely proportional variations in the exposure time to ensure that lines of pixels are of uniform size.

The exposure control system allows a dc motor to be used in low cost commercial scanning products. The dc motor has a smaller size, quieter operation and smoother motion than the step motor. The dc motor also has a broader speed range (including higher speeds), lower power consumption, and simpler drive electronics than a step motor. Additionally, the dc motor is lower in cost at an equivalent level of performance.

Other aspects and advantages of the present invention will become apparent from the following detailed description, taken in conjunction with the accompanying drawings, illustrating by way of example the principles of the present invention.

BRIEF DESCRIPTION OF THE DRAWINGS

FIG. 8 is a illustration of a handheld scanner according to the present invention.

DETAILED DESCRIPTION OF THE INVENTION

Figure 1:
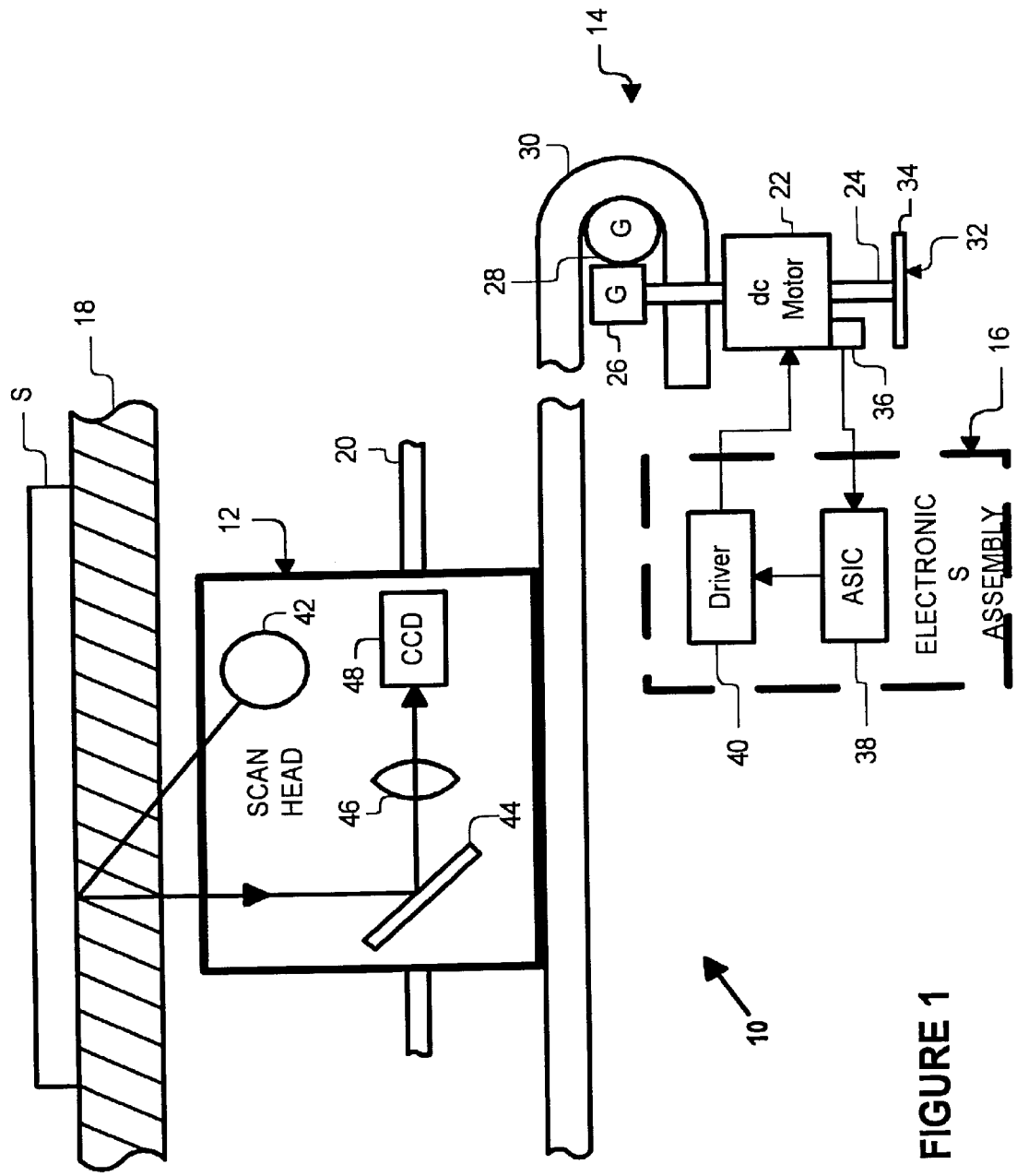
FIG. 1 an illustration of a flatbed scanner according to the present invention.

As shown in the drawings for purposes of illustration, the present invention is embodied in different scanners. Each scanner includes a detector, an encoder and an exposure control system. The exposure control system receives speed or position information from the encoder and adjusts the detector exposure time to ensure that the pixels in a scanned image are of uniform size. The exposure control allows the use of a dc motor instead of a step motor in low-cost commercial scanning products. The dc motor has a smaller size, quieter operation, and smoother motion than the step motor. The dc motor also has a broader speed range, lower power consumption, and simpler drive electronics than the step motor. Additionally, the dc motor is lower in cost at an equivalent level of performance.

Reference is now made to FIG. 1, which shows a flatbed scanner 10. The flatbed scanner 10 includes a scan head 12, a dc motor drive assembly 14, an electronics assembly 16, a glass pane 18 and a housing (not shown). The glass pane 18 and the housing form an enclosure inside which the scan head 12, the motor drive assembly 14 and the electronics assembly 16 are mounted.

The dc motor drive assembly 14 includes a pair of slider rods 20 for guiding the scan head 12 in a linear direction along the glass pane 18, and a dc motor 22 and transmission for moving the scan head 12 along the slider rods 20. The dc motor 22 can be a brush or brushless dc motor that rotates at speeds between fifty and five thousand rpm. The transmission is typical to flatbed scanners: a motor shaft 24 turns a worm gear 26, which drives a gear 28 that turns a timing belt 30. The timing belt 30 moves the scan head 12. It takes a number of motor shaft revolutions to move the scan head 12 an inch along the slider rods 20.

The motor drive assembly 14 further includes an encoder 32 including an encoder wheel 34 and an encoder assembly 36. The encoder wheel 34 is secured concentrically to an opposite end of the motor shaft 24 and rotates jointly with the motor shaft 24. The encoder wheel 34 typically includes a plurality of radially-extending spokes that are evenly spaced apart on the wheel 34. The encoder wheel 34 rotates relative to the encoder assembly 36, which can be mounted to the dc motor 22. When a spoke is detected by the encoder assembly 36, the encoder assembly 36 generates a pulse or some other kind of mark. Thus, each pulse on an output of the encoder assembly 36 represents a relative incremental rotation of the encoder wheel 34. This incremental rotation is proportional to an incremental linear motion of the scan head 12. Of course, the number of pulses per inch of linear movement of the scan head 12 will depend upon factors such as resolution of the encoder (in lines per motor revolution) and linear distance the transmission moves the scan head 12 for each motor revolution. For example, an encoder wheel 34 having approximately 400 lines might generate 4800 pulses for each inch of linear movement of the scan head 12. Thus, resolution of the encoder would be 4800 lines per inch ("lpi").

The electronics assembly 16 includes an application specific integrated circuit ("ASIC") 38 and a dc motor driver 40 such as an H-bridge motor driver. The driver 40 has an input that is adapted to receive pulse width modulated ("PWM") signals from a motion controller/speed controller on the ASIC 38. The PWM signals cause the dc motor driver 40 to selectively energize field windings of the dc motor 22 to create a motor torque. The PWM signals can cause the dc motor 22 to rotate the shaft 24 in either a clockwise or counterclockwise direction.

To scan a sheet S of paper, the sheet S is positioned atop the glass pane 18, and a host (e.g., a personal computer) commands the electronics assembly 16 to begin a scanning operation. The host might also supply a scan resolution such as 1200 dots per inch ("dpi") to the electronics assembly 16. Under control of the ASIC 38, the dc motor drive assembly 14 moves the scan head 12 along the slider rods 20 to a known position (e.g., a wall) and then starts moving the scan head 12 along the slider rods 20. A fluorescent bulb 42 of the scan head 12 is turned on to illuminate a portion of the sheet S with white light, and an optics assembly 44, 46 focuses an image of the illuminated portion onto a charge coupled device ("CCD") 48. The CCD 48 is exposed to, and integrates, a line of pixels at a time, and an electronics assembly 16 processes signals generated by the CCD 48 and sends the processed signals to the host. The entire sheet S is scanned, line-by-line, as the scan head 12 is moved along the slider rods 20.

The ASIC 38 includes an exposure control, which adjusts the exposure time of the CCD 48 such that exactly one pixel distance is traversed during each exposure time, regardless of any small position or velocity errors in controlling the dc motor 22. The exposure control generates a transfer gate signal for each channel of the CCD 48. To scan a line, the exposure control de-asserts the transfer gate signal to begin an exposure time, processes the encoder pulses and then asserts the transfer gate signals to stop the exposure time after a specified amount of relative motion has occurred. Thus, the exposure control varies the exposure time to ensure that each exposure time corresponds to the same displacement and that the lines of pixels in a scanned image are all of uniform size. Such an exposure control allows the dc motor 22 to be used in low cost commercial scanning products.

The ASIC 38 can optionally include a servo loop for compensating for intensity and spectrum drift of the fluorescent bulb 42. The ASIC 38 also includes a gain compensation control for adjusting gain to maintain a uniform exposure level. The exposure level is a product of reflected light intensity from the object being scanned, CCD sensor responsivity, exposure time, and gain. The reflected light intensity and the CCD sensor responsivity are relatively constant throughout a scan. Therefore, the exposure level is held at a relatively uniform level by decreasing the gain to offset an increase in the exposure time, and by increasing the gain to offset a decrease in exposure time.

Figure 2:
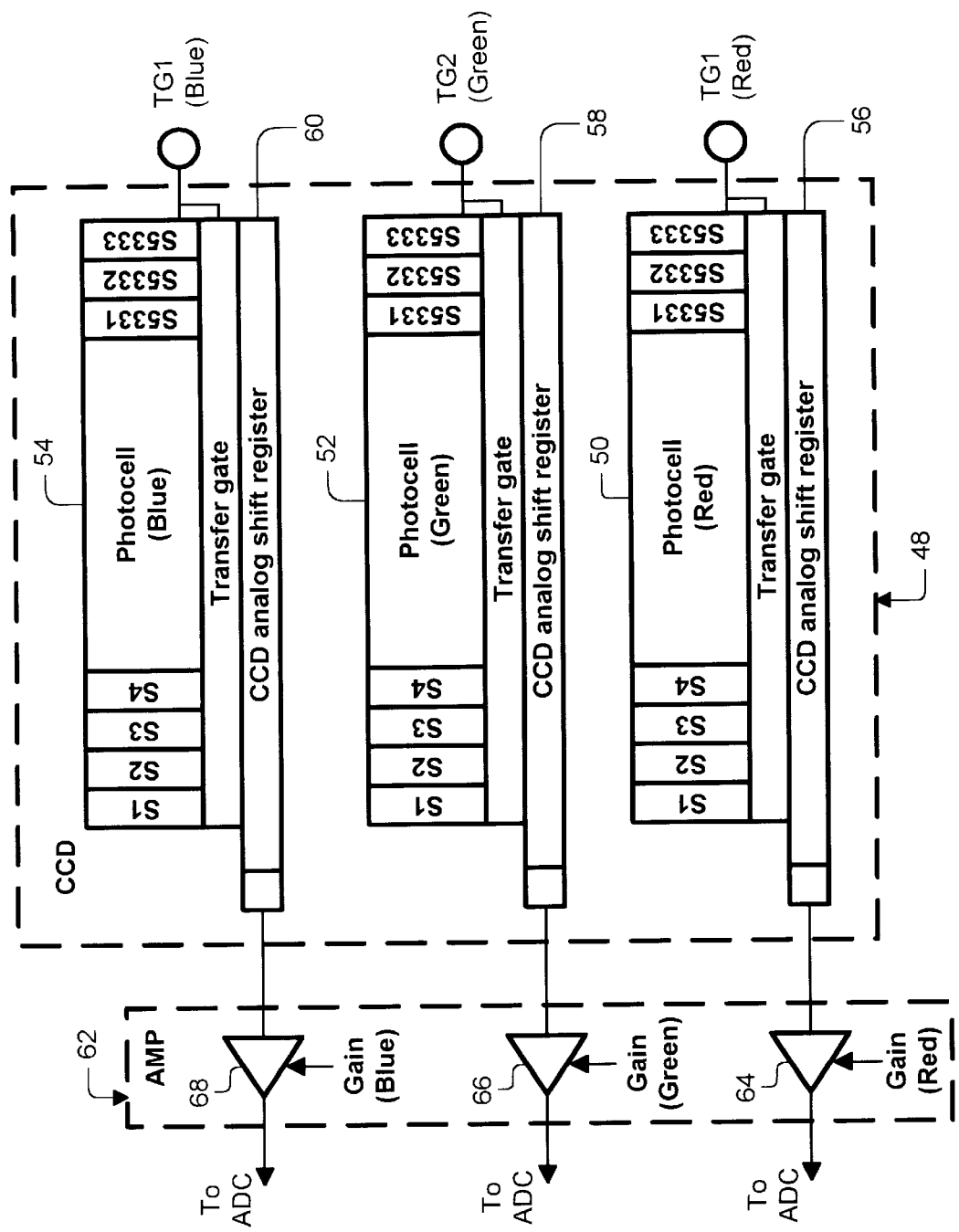
FIG. 2 is an illustration of a charge coupled device that forms a part of the flatbed scanner shown in FIG. 1.

Reference is now made to FIG. 2, which shows the CCD 48 in greater detail. The CCD 48 includes a Red channel including a first row of photodiodes 50 sensitive to red light, a Green channel including a second row of photodiodes 52 sensitive to green light, and a Blue channel including a third row of photodiodes 54 sensitive to blue light. Transfer gate and CCD analog shift register 56, 58, 60 are provided for each channel. The transfer gate is a shutter control for the CCD 48. Spacing between the rows of photodiodes 50, 52, 54 is typically between $1/150$ and $8/150$ of an inch.

Each channel is adapted to receive a transfer gate signal. When a transfer gate signal is de-asserted, the photodiodes 50, 52, 54 accumulate charge. When the transfer gate signal is asserted, the charge accumulated by the photodiodes 50, 52 or 54 is transferred to the analog shift register 56, 58 or 60. The analog shift registers 56, 58 or 60 then serially read out the charges to an amplifier chip 62 including programmable gain amplifiers 64, 66 and 68 for each channel. Analog outputs of the programmable gain amplifiers 64, 66 and 68 are then A/D converted and sent to the host.

The three channels are processed in parallel. Additionally, while the contents of the shift registers 56, 58 and 60 are being shifted out by a shift clock (not shown) and processed, the photodiodes 50, 52 and 54 are accumulating charges for the next line of pixels. When the next transfer gate signal is asserted, the contents of the photodiodes 50, 52 and 54 are transferred to the analog shift registers 56, 58 and 60.

Figure 3:
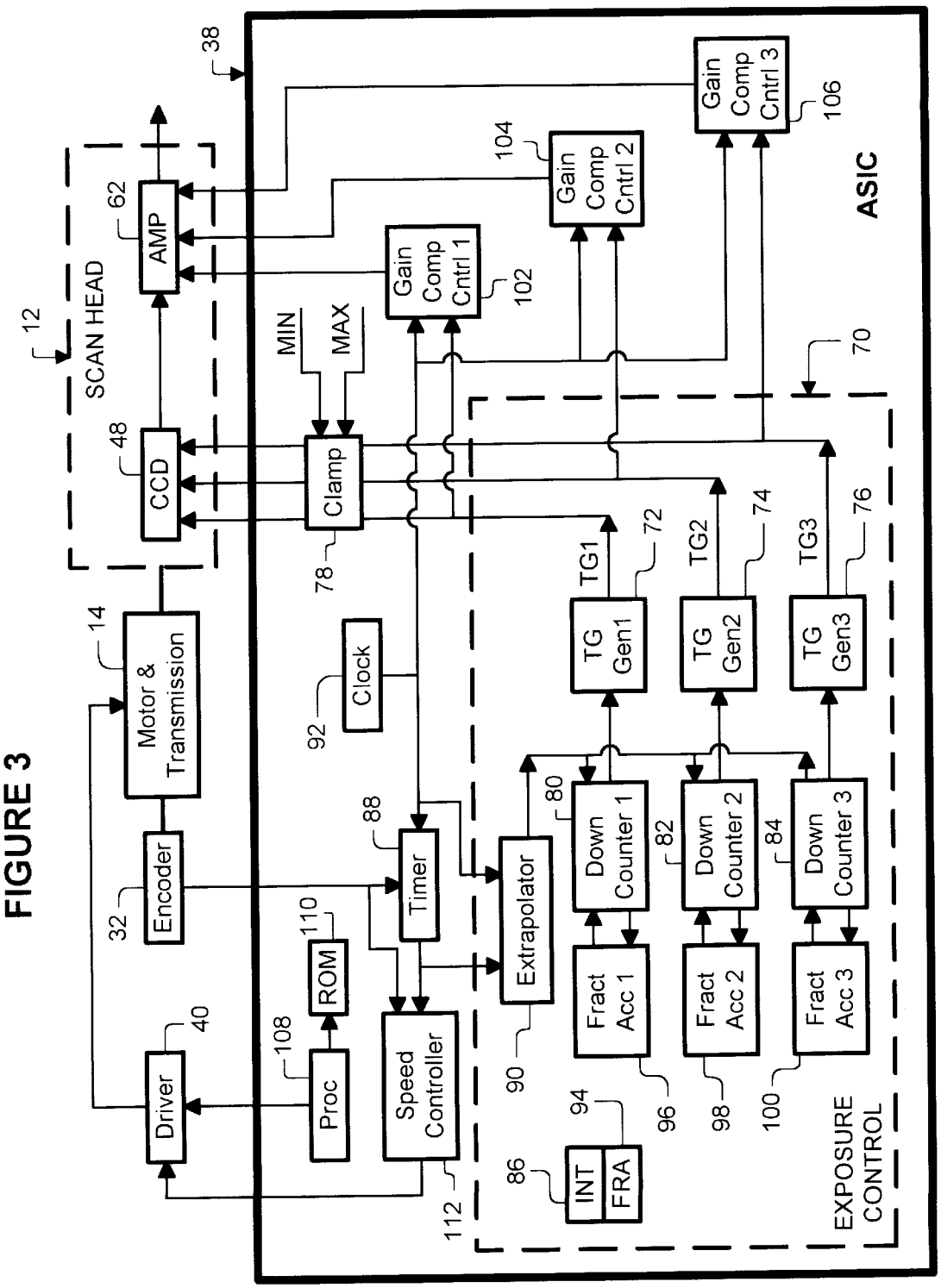
FIG. 3 is a detailed illustration of an integrated circuit that forms a part of the flatbed scanner shown in FIG. 1.

Reference is now made to FIG. 3, which shows the ASIC 38 in greater detail. The exposure control, indicated generally by reference numeral 70, includes first, second and third transfer gate generators 72, 74 and 76 for supplying the transfer gate signals TG1, TG2, TG3 to the Red, Green and Blue channels, respectively. The transfer gate signals are shutter control signals for the CCD 48. When a transfer gate generator 72, 74 or 76 is triggered, it asserts a transfer gate signal TG1, TG2 or TG3. After a fixed interval (sufficient to allow the accumulated charge in the photodioides 50, 52, 54 to be transferred to the analog shift registers 65, 58, 60), the transfer gate generator 72, 74 or 76 de-asserts the transfer gate signal TG1, TG2 or TG3 to begin a new exposure time.

The ASIC 38 further includes a clamp 78 for ensuring that each exposure time is within minimum and maximum limits MIN, MAX. Clamping to the minimum limit MIN prevents corruption of a new scan line from a previous scan line. Clamping to the maximum limit MAX prevents saturation of the CCD 48. The minimum and maximum limits MIN, MAX are programmable.

Each transfer gate generator 72, 74, 76 is triggered by a down counter 80, 82, 84. Each down counter 80, 82, 84 includes a writeable register for holding a count and logic for decrementing the count by one in response to an input pulse. Each down counter 80, 82, 84 triggers its transfer gate generator 72, 74, 76 when the count in its writeable register reaches zero. After a down counter 80, 82, 84 triggers its transfer gate generator 72, 74, 76, it reloads its writeable register with a value INT, and once again begins decrementing the count stored in its writeable register. The value INT is stored in a first register 86.

How fast a down counter 80, 82, 84 decrements its count depends upon how fast it receives input pulses. The input pulses could be supplied by the encoder 32. At a scan resolution of 300 pixels per inch ("ppi"), a 4800 lpi encoder 32 would generate sixteen encoder pulses per pixel. At the beginning of a scan, a reload value INT of sixteen would be stored in the first register 86. Thus, after the first down counter 80 receives sixteen pulses from the encoder 32 (indicating that the scan head 12 has been moved a distance of one pixel), the first down counter 80 would trigger the first transfer gate generator 72 to end the exposure period for the Red channel. The second down counter 82 would trigger the second transfer gate generator 74 after counting down to zero, and the third down counter 84 would trigger the third transfer gate generator 76 after counting down to zero.

At a scan resolution of 1000 ppi, however, the 4800 lpi encoder 32 would generate 4.8 encoder pulses per pixel. At the start of a scan, the first register 84 would be loaded with a reload value of four. The first down counter 80, for example, would trigger the first transfer gate generator 72 on every fourth encoder pulse. Resulting would be a maximum pixel size error of (4.8-4)/4.8 or about 16%. A 16% maximum pixel size error would appear as fringing or jaggies in a scanned image.

A higher resolution encoder could be used to generate a greater number of pulses per inch of scan head movement, but that would be more expensive and, therefore, not feasible for a low cost commercial scanning product.

Instead of using a higher resolution encoder, the exposure control 70 uses an encoder 32 having a low resolution and a combination of an interval timer 88 and an extrapolator 90 for increasing the apparent resolution of the encoder 32. The interval timer 88 measures a time period (Tmeas) between first and second encoder pulses. The time period (Tmeas) is measured by counting clock pulses supplied by a system clock 92. For example, the interval timer 88 could be a 16-bit counter that is incremented at a clock speed of 30 MHz.

The extrapolator 90 divides the measured period (Tmeas) by an extrapolation factor (e.g., 16×) to derive a smaller time period (Tnew) and then outputs extrapolator pulses (between the second encoder pulse and a third encoder pulse) at a frequency equal to 1/Tnew. Thus, the extrapolator pulses generated between the second and third encoder pulses are extrapolated from a measurement of time between the first and second encoder pulses. The extrapolator pulses are supplied to the down counters 80, 82, 84. A more detailed description of the extrapolator 90 will be provided below in connection with FIG. 6.

The reload value INT stored in the first register 86 describes a desired pixel size or gate transfer length based on a scanning resolution, encoder resolution and extrapolation factor. A transfer gate length is computed as encoder resolution times extrapolation factor divided scan resolution. The integer portion INT of the transfer gate length is stored in the first register 82 and a fractional portion FRA of the transfer gate length is stored in a second register 94. Thus, the first and second registers 86 and 94 are updated at the beginning of a new scan.

For example, the 4800 lpi encoder 32 will still output 4.8 pulses per pixel at a scan resolution of 1000 ppi. However, the extrapolator 90, using a factor of sixteen, will generate 76.8 extrapolator pulses per pixel. If the first register 86 is loaded with a value of seventy six, the first down counter 80 will trigger the first transfer gate register after every 76 extrapolator pulses. The resulting maximum pixel error size will be (76.8–76)/76.8 or roughly one percent.

The measured times and extrapolator frequencies are updated after each encoder pulse. If the dc motor 22 is running at a nominal speed, the interval timer 92 will provide a nominal measured time (Tmeas) between encoder pulses, and the extrapolator 90 will generate extrapolator pulses at a nominal frequency. Consequently, the exposure times will be nominal. If, however, the motor 22 slows down, the measured time (Tmeas) between encoder pulses will increase, and the extrapolator 90 will generate the extrapolator pulses at a frequency below the nominal frequency. Consequently, the down counters 80, 82, 84 will take longer to reach zero, and the exposure times will be increased above the nominal time. If the motor 22 speeds up, the measured time (Tmeas) between encoder pulses will decrease, and the extrapolator 90 will generate the extrapolator pulses at frequency higher than the nominal frequency. Consequently, the down counters 80, 82, 84 will not take as long to reach zero, and the exposure times will be less than the nominal time. Thus, exposure time is varied to produce uniform pixel sizes.

The second and third transfer gate generators 74 and 76 (for the Green and Blue channels) could be triggered at the same time as the first transfer gate generator 72 (for the Red channel). However, the color planes would not be in registration unless row spacing is an integer multiple of the scan resolution. To perform registration of the color planes, the starts of the exposure times for the channels are staggered. This is done by initializing the writeable registers of the down counters 80, 82, 84 with different values at the beginning of each scan. At a scan resolution of 1000 dpi, for example, the writeable register of the second down counter 82 would be initialized with a value of fifty (i.e., roughly two-thirds the value INT) and the writeable register of the third down counter 84 would be initialized with a value of twenty five (i.e., roughly one-third the value INT). Thus, for each line, the exposure time of the Blue channel would start before the exposure time of the Green channel, and the exposure time of the Green channel would start before the exposure time of the Red channel. After counting down to zero, the first, second and third down counters 80, 82, 84 would, upon reset, reload their writeable registers with the same reload value INT. Thus, the exposure starts for the channels would remain staggered.

The fractional portion FRA stored in the second register 94 is used to prevent the maximum pixel error from accruing over the scanned image. If a 1% error were allowed to accrue, the size of the scanned image would be increased or decreased by 1%. If, however, the down counters 80, 82, 84 trigger the transfer gate generators 72, 74, 76 on an average of the transfer gate length, the error will not accrue.

For a transfer gate length of 76.8 extrapolator counts, the error will not accrue if the first down counter 80 triggers the first transfer gate generator 72 after seventy-six extrapolator counts, then triggers after seventy-seven extrapolator counts, then after seventy-seven extrapolator counts, then after seventy-seven extrapolator counts, and then seventy-seven extrapolator counts. The first transfer gate generator 72 will be triggered an average of 76.8 extrapolator counts. The pixels in the line corresponding to the seventy-six extrapolator counts would have a size error of about 1 percent. The other four lines of pixels would have size errors of 0.2 percent.

The average transfer gate length is achieved by dithering the counts in the writeable registers of the down counters 80, 82, 84. The dithering is performed by first, second and third fractional accumulators 96, 98 and 100. Each fractional accumulator includes an accumulator and logic for adding the fractional portion FRA to the value in the accumulator. The logic adds the fractional portion FRA when the associated down counter 80, 82 or 84 is reloaded. The accumulator retains only the fractional portion and discards the integer portion. The accumulator also has a carry out. When the carry out is equal to one, the logic increments the integer portion INT that is reloaded in the writeable register of the associated down counter 80, 82 or 84.

The table below provides an example of how the first fractional accumulator 96 operates when the transfer gate length is 76.8 counts.

| Reload No. | Accum | Carry Out | Count from |
|---|---|---|---|
| Init | 0.0 | — | — |
| 1 | 0.8 | 0 | 76 |
| 2 | 0.6 | 1 | 77 |
| 3 | 0.4 | 1 | 77 |
| 4 | 0.2 | 1 | 77 |
| 5 | 0.0 | 1 | 77 |
| 6 | 0.8 | 0 | 76 |

At the start of a scan the first fractional accumulator 96 is initialized with the value 0.0. When the scan begins (reload no. 1), the integer portion INT is loaded into the writeable register of the first down counter 80. Thus, the first down counter 80 counts down from seventy-six to zero. Over reload nos. 2 to 5, the accumulator has a carry out of one. Consequently, the integer portion INT+1 is reloaded into the writeable register of the first down counter 80. Thus, after reload nos. 2 to 5, the first down counter 80 counts down from seventy-seven to zero.

Figure 4:
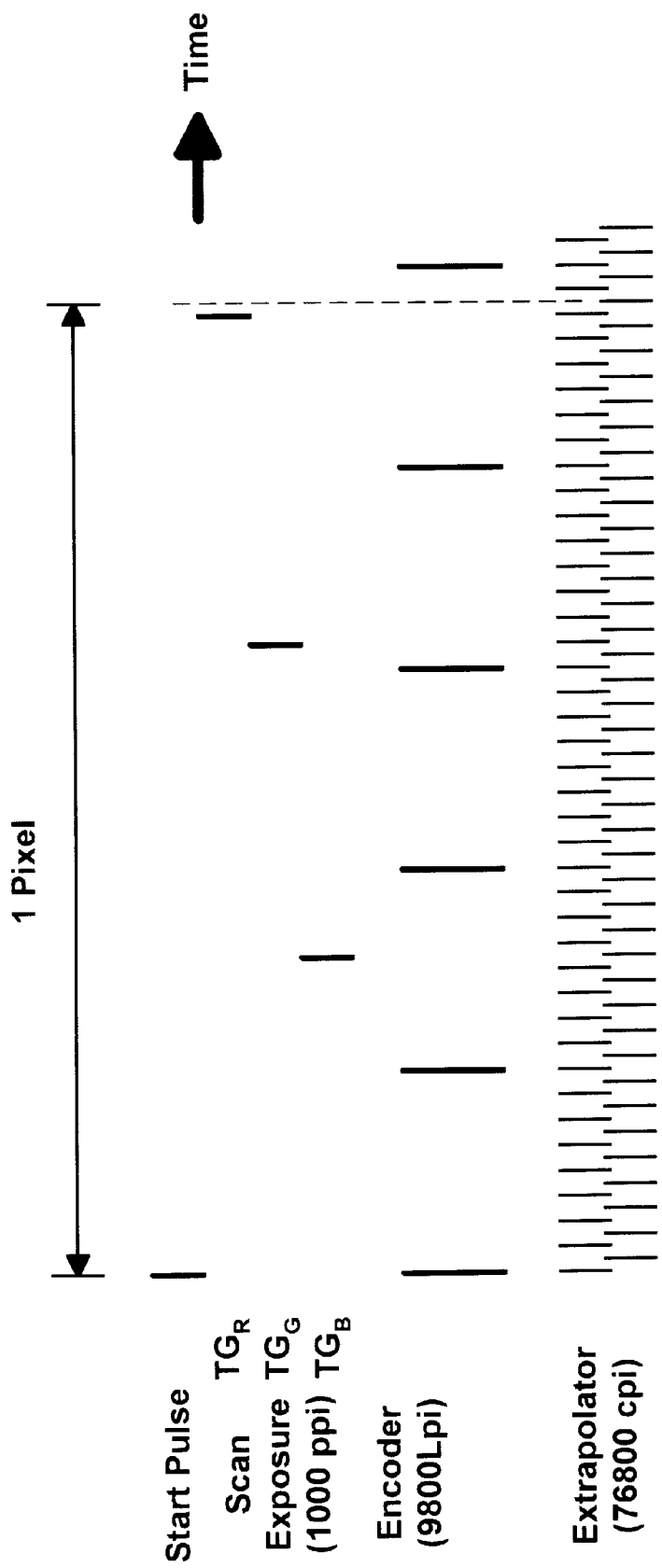
FIG. 4 is timing diagram of pulses generated by an exposure control circuit, which forms a part of the integrated circuit shown in FIG. 3.

Thus, the extrapolator 90 increases the positional resolution at which the transfer gate generators 72, 74, 76 can be triggered, and the fractional accumulators 96, 98, 100 prevent error from accruing over the scanned image. The increased resolution is illustrated in FIG. 4.

The exposure control circuit 70 further includes first, second and third gain compensation controls 102, 104 and 106. Each gain compensation control 102, 104, 106 supplies a gain to a corresponding programmable gain amplifier 64, 66 and 68 in the amplifier chip 62. The gains might be different for the different channels.

Each gain is expressed as an amplifier code. The gain code G is equal to:

$$G = NG + (\Delta Time)(SLOPE)$$

where NG is an amplifier code for nominal gain, ΔTime is a difference in measured exposure time and target exposure time, and SLOPE is a predetermined value that converts the delta exposure time to an amplifier code representing a delta gain. Thus, the gain code G is increased if the exposure time is decreased below the target exposure time, and the gain code G is decreased if the exposure time is increased above the target exposure time. For example, the gain compensation control 102 might decrease gain by 1% in order to compensate for a 1% increase in exposure time. In this manner, the gain is varied to maintain uniform exposure level. For best performance, the gain compensation should operate on the current scan line corresponding to the latest exposure time measurement.

The ASIC 38 further includes an embedded processor 108 that is programmed by a read-only memory 110 ("ROM"). The ROM 110 stores a real-time operating system for the embedded processor 108. The ROM 110 also stores instructions for instructing the embedded processor 108 to perform I/O functions and perform the general control of the scanner 10.

One of the functions performed by the embedded processor 108 is to configure the exposure control 70 for different scan resolutions. The scan resolution can be supplied by the host, or the embedded processor 108 can be programmed to select a scan resolution stored in the ROM 110. For example the ROM 110 might be programmed with a plurality of scan resolutions, from 50 dpi to 2400 dpi in increments of one dpi. The embedded processor 108 would select one of the scan resolutions and configure the exposure control 70 for the selected scan resolution.

The embedded processor 108 sets up the extrapolator 90, loads the first and second registers, programs the clamp 78 and initializes the down counters 80, 82, 84 and fractional accumulators 96, 98, 100 at the start of each scan once the scan resolution is known.

The embedded processor 108 is also programmed to implement the bulb servo control for compensating the intensity and spectrum drift of the fluorescent bulb 42. The bulb servo control updates nominal gains in the gain compensation controls 102, 104, 106 (see FIGS. 3 and 5) in response to changes in intensity and drifts in spectrum of the bulb 42. A bulb servo control is disclosed in U.S. Ser. No. 08/815,289, now U.S. Pat. No. 5,907,742, filed on Mar. 11, 1997 and incorporated herein by reference.

The embedded processor 108 is also programmed to implement the motion controller. The motion controller can be an open or closed loop control that accelerates the scan head 12 to a scan speed and maintains the scan speed at a relatively constant speed during a scan operation. A closed loop motion control could include a simple proportion-integral-derivative (PID) controller that receives position feedback from the encoder 32 and velocity feedback from the interval timer 88.

The ASIC 38 also includes a speed controller 112 that controls slew rate of the dc motor 22. Performing the speed control using the ASIC 38 instead of the embedded processor 108 reduces the processing burden on the embedded processor 108 and frees it up to perform other functions. Running at high frequency, the hardware-based speed controller 108 provides accurate speed control of the dc motor 22 and reduces the velocity and position errors. The combination of the firmware motion controller and the hardware-based speed controller 112 can keep variations in motor speed to less than 10%. One such motion/speed controller is disclosed in the Hewlett-Packard Technical Journal October, 1981.

Figure 5:
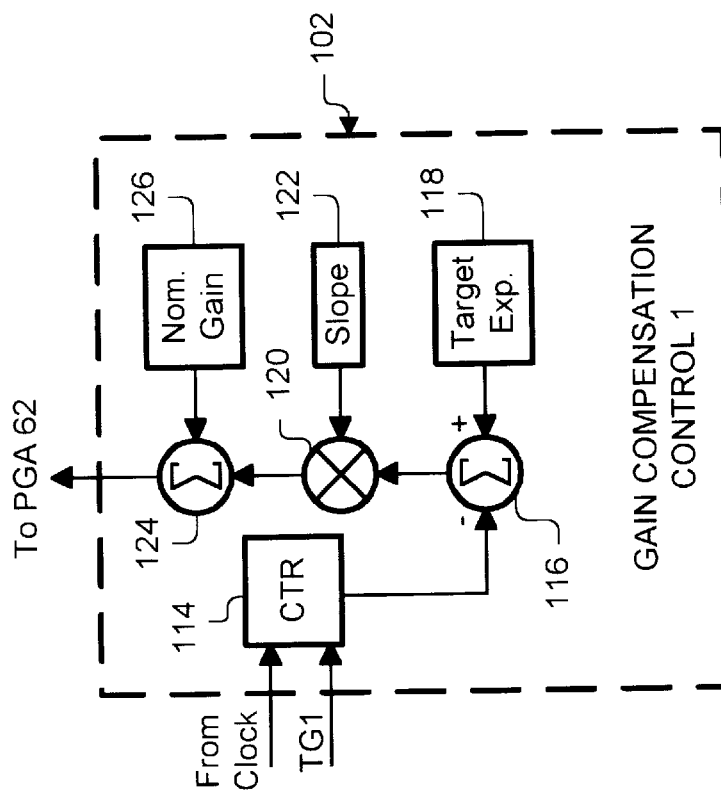
FIG. 5 is an illustration of a gain compensation control, which forms a part of the integrate circuit shown in FIG. 3.

FIG. 5 shows the first gain compensation control 102 in greater detail. The first gain compensation control 102 includes a counter 114 that measures the time between assertions of the first transfer gate signal TGI. The counter 114 can be a synchronous state machine running off the system clock 92. The counter 114 can be incremented by pulses from the system clock 92 and reset after the first transfer gate signal TG1 is asserted. Thus, the exposure time is measured as a count of clock pulses.

The delta time is determined by a subtractor 116, which subtracts the measured exposure time from the target exposure time. The target exposure time, expressed in counts, is stored in a third register 118.

The delta gain is determined by a multiplier 120, which multiplies the delta time by the SLOPE. The value for SLOPE is stored in a fourth register 122.

A second summer 124 adds the delta gain to a value for nominal gain. The value for nominal gain is stored in a fifth register 126. The value for gain is sent to the first programmable gain amplifiers 64 during assertion of the first transfer gate signal TG1.

The embedded processor 108 stores values of the target exposure, SLOPE and nominal gain in the register 118, 122, 126 at the start of a scan. There might be different target exposures corresponding to different scan resolutions. The different values for the target exposures would be stored in the ROM 110. The values for nominal gain will also be updated by the bulb servo control.

It is understood that all three gain compensation controls 102, 104 and 106 have the same basic construction. Only the values for the target exposure, SLOPE and nominal gain will be different.

Figure 6:
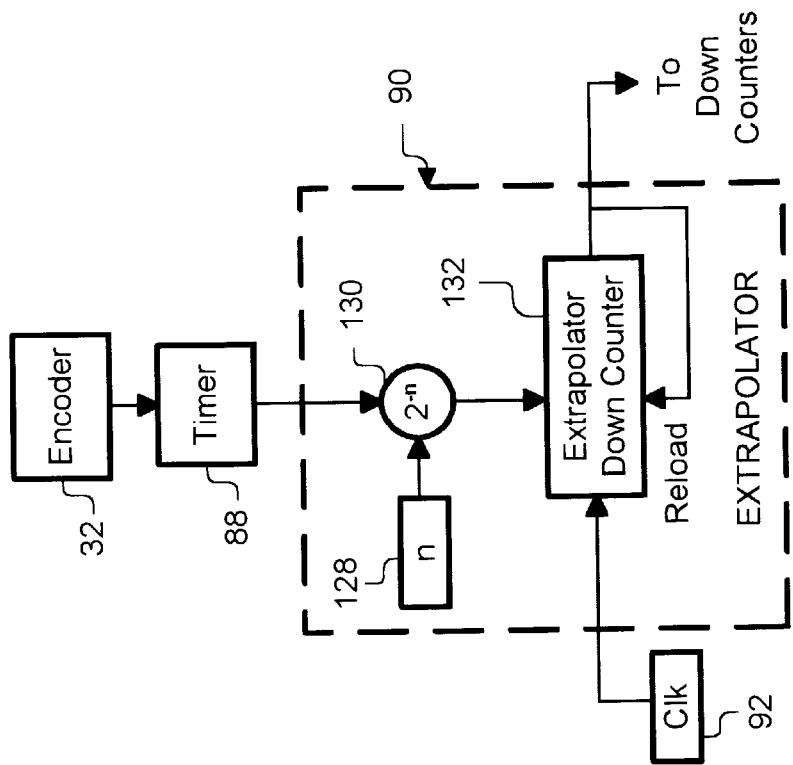
FIG. 6 is an illustration of an extrapolator, which forms a part of the exposure control s own in FIG. 4.

FIG. 6 shows the extrapolator 90 in greater detail. A value n for the extrapolation factor is stored in a sixth register 128, and a barrel shifter 130 divides the timer interval count (measured in clock pulses) by the extrapolation factor ($2^n$). An output of the barrel shifter 130 provides an extrapolator reload value to an extrapolator down counter 132. Each clock pulse from the system clock 92 causes the extrapolator down counter 132 to decrement its count by a value of one. When the count reaches zero, the extrapolator down counter 132 reloads and outputs an extrapolator count. Thus, output resolution of the extrapolator 90 is $2^n$ times the input resolution.

Figure 7:
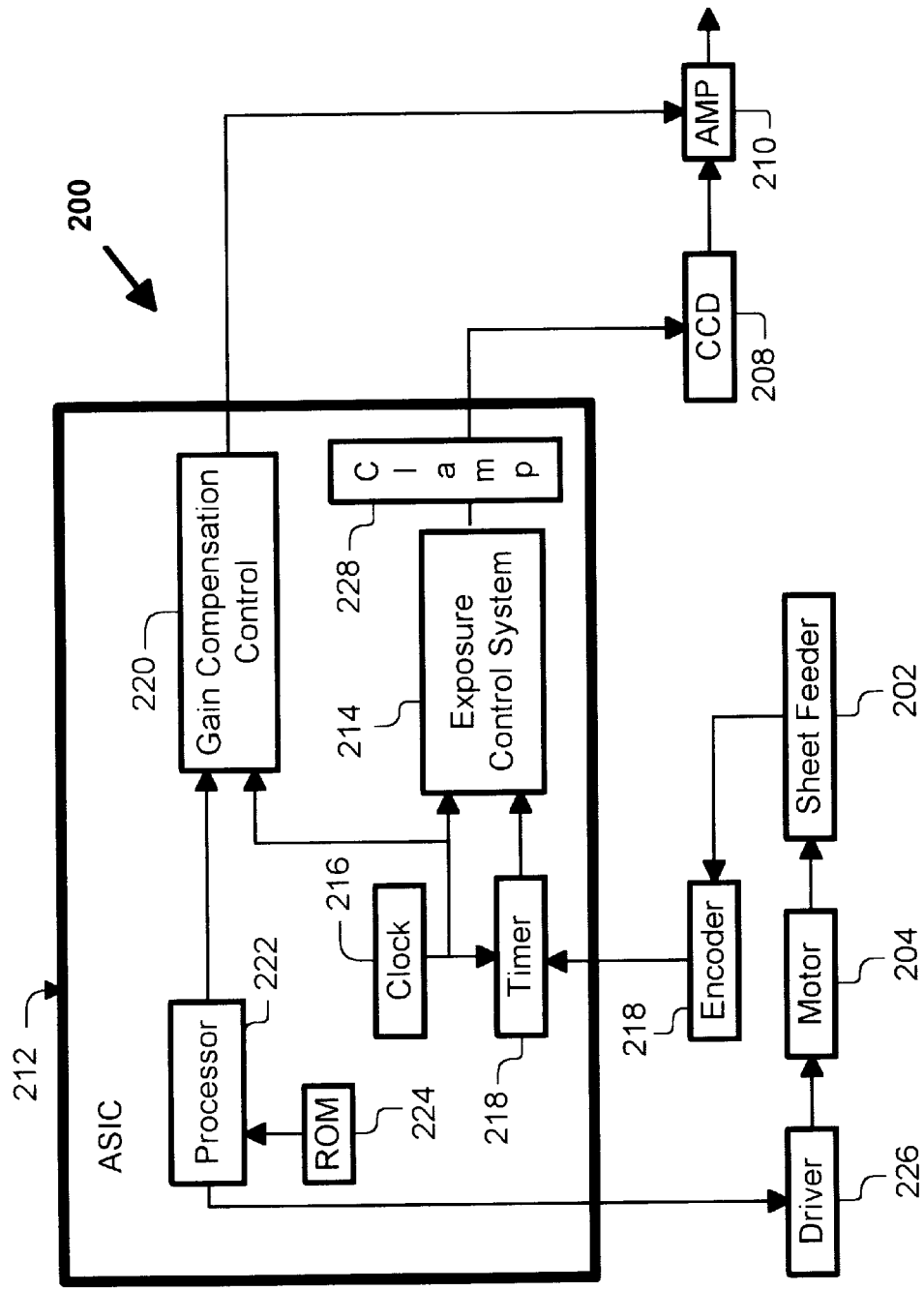
FIG. 7 an illustration of a scrollfed scanner according to the present invention.

FIG. 7 shows a scrollfed scanner 200 according to the present invention. The scrollfed scanner 200 includes a sheet feeder 202 that is driven by a dc motor 204. The sheet feeder 202 includes a roller (not shown) that is rotated by the motor 204. When pressed against a sheet and rotated, the roller advances the sheet through the sheet feeder 202. A position encoder 218 generates pulses corresponding to an incremental linear advancement of the sheet through the sheet feeder 202. A wheel of the encoder 218 can be attached to the roller or a motor shaft.

A CCD 208 scans the sheet, line-by-line, as the sheet is advanced through the sheet feeder 202. An output of the CCD 208 is supplied to an amplifier chip 210 including a plurality of programmable gain amplifiers.

An ASIC 212 includes an exposure control 214, which adjusts the exposure time of the CCD 208 such that exactly one pixel distance is traversed during each exposure time, regardless of any small position or velocity errors in controlling the dc motor 204. A system clock 216 and interval timer 218 allow the exposure control 214 to perform an extrapolation function. Thus, the encoder 206 can be inexpensive and have relatively low resolution.

The ASIC 212 also includes a gain compensation control 220 for adjusting gain of the programmable gain amplifiers to maintain a uniform exposure level. An embedded processor 222 receives its instructions from a ROM 224 and controls the motion of the motor 204. PWM signals are supplied to a driver 226 for the dc motor 204. The PWM signals cause the driver 226 to selectively energize field windings of the dc motor 204 to create a motor torque.

A clamp 228 ensures that the exposure time is within minimum and maximum limits. The minimum and maximum limits of the clamp 228 are wider than those for the clamp 78 of the flatbed scanner 10. The wider limits allow compensation at lower speeds, which might occur while the motor 206 is accelerating or decelerating a sheet through the feeder. Thus, the scrollfed scanner 200 can scan the sheet while accelerating and decelerating. In contrast, the scan head 12 of the flatbed scanner 10 typically performs a scan at a near-constant velocity.

FIG. 8 shows a handheld scanner 300 according to the present invention. The handheld scanner 300 includes a carrier having a handle portion and a housing portion (not shown). The handle portion is shaped to be grasped by the hand of an operator, and the housing portion contains a CCD 302. The CCD 302 looks out through a window in the housing portion. An amplifier chip 304 for the CCD 302 is also contained within the housing portion.

A roller 306 is mounted external to the housing, and an encoder 308 is attached to the roller. During a scanning operation, the roller 306 is placed in physical contact with the surface S of the image being scanned. The CCD 302 is moved along the surface S, scanning the surface, line-by-line. The roller 306 and encoder 308 measure the linear distance that the CCD 302 is being moved along the surface S.

An ASIC 310 includes an exposure control 312, which adjusts the exposure time of the CCD 302 such that exactly one pixel distance is traversed during each exposure time, regardless of any unsteady and uneven motion of the operator's hand. A system clock 314 and interval timer 316 allow the exposure control 312 to perform an extrapolation function. A gain compensation control 318 adjusts gain of programmable gain amplifiers on the amplifier chip 304 to maintain a uniform exposure level.

Thus disclosed is a detector exposure control that allows pixels to be of uniform size. The uniform pixel size results in a high quality image. The exposure control allows scanning even while the motor drive system is accelerating the scan head or paper. Thus, an image can be scanned during acceleration and deceleration of the scan head or paper.

The detector exposure control system allows a dc motor to be used in low cost commercial scanning products. The dc motor has a smaller size, lighter weight and quieter operation than a step motor.

The dc motor also has a broader speed range (including higher speeds) and smoother motion than a step motor. The motion of the dc motor is smooth and continuous in comparison to the step-like motion of the step motor. A scanner including a dc motor can have a greater number of scan resolutions than a scanner including a step motor.

The dc motor has lower power consumption than the step motor. Consequently, the dc motor can use less expensive driver electronics than the step motor (step motors used in commercial scanner products typically have two phases and generally require higher currents:). Additionally, the dc motor system has position feedback, so true position and motor stalling can be determined. Consequently, the dc motor does not have to be overdriven with a considerable amount of extra torque to satisfy a worst case load. This allows size, cost and heat dissipation of the dc motor driver electronics to be reduced.

Although the invention was described in connection with flatbed, scrollfed and handheld scanners, it is not so limited. Other applications of the present invention include, but are not limited to low cost commercial scanning products such as copiers, fax machines, and multi-function products. In systems where the scan head is moved, the exposure control would compensate for scan head drive errors. In systems where the scan head is fixed, the exposure control would compensate for paper drive errors. For non-motor driven systems, the exposure control system could compensate for non-constant motion.

Specific embodiments of the invention have been described and illustrated above. However, the invention is not limited to these specific embodiments. For example, any type of position encoder could be used. The encoder might be a linear encoder that measures motion of the scan head along the rail. The linear encoder would include an encoder strip instead of an encoder wheel. The encoder might include a wheel or strip including spokes or lines having reflective and non-reflective regions, light-transmissive and opaque regions, or magnetic and non-magnetic regions.

The invention is not even limited to a position encoder. For example, a velocity sensor could be used instead of a position encoder. The exposure control would respond to increases in velocity by decreasing exposure time, and it would respond to decreases in velocity by increasing exposure time, all in an effort to maintain uniform pixel size.

A detector other than a CCD could be used. Other types of detectors that could be used include CMOS detectors and active pixel sensors. If the detector is an active pixel sensor, the exposure control system would not include a transfer gate generator. A transfer gate implies a serial shift register, which is specific to CCD-type detectors. Instead, the exposure control would include a different type of shutter control that starts and stops the exposure intervals. The shutter control for an active pixel sensor would be little more than a switch that turns the detectors or light sources on and off.

The extrapolation function could be eliminated and exposure time could be adjusted by triggering the transfer gate generator directly off the incoming encoder pulses. A combination of a high-cost, high-resolution position encoder and a motor drive assembly could be used to generate at least one pulse for every pixel of movement.

A scanning system including a motor-driven scan head or paper feeder is not limited to any particular type of speed controller or motion controller. In fact, the scanning the slew controller could be eliminated. Additionally, a step motor could be used instead of the dc motor.

The exposure control, gain compensation control, speed controller and embedded processor could be fabricated on a single ASIC, they could be fabricated on multiple ASICs, or they could be fabricated on one or more field programmable gate arrays.

There will also be design considerations that depend upon factors such as the quality and cost of the scanner. For example, a low cost scanner might force the transfer gates to trigger at the same time using a single pulse. Gains can be digital or analog and they can be applied in the scanner or a host. Nominal values will be scanner-dependent.

Therefore, the invention is not limited to the specific embodiments described above. Instead, the invention is construed according to the claims that follow.

What is claimed is:

1. An optical scanning system comprising:
 a photodetector including at least one row of photodetector elements, exposure time of the photodetector elements being stopped and started in response to a first signal;
 motion detection means for detecting relative motion with respect to the photodetector, an output of the motion detection means providing a second signal indicating a characteristic of the relative motion; and
 an exposure control, responsive to the second signal, for generating the first signal to control the starting and stopping of the exposure time, the exposure control starting the exposure time and then stopping the exposure time after a specified amount of relative motion has been detected;
 whereby variations in the amount of relative motion cause inversely proportional variations in the exposure time to ensure that lines of pixels of a scanned image are all of uniform size.

2. The scanning system of claim 1, wherein the motion detection means includes a position encoder, the second signal providing information about relative position of the photodetector.

3. The scanning system of claim 2, wherein the exposure control includes:
 a shutter control for the photodetector; and
 triggering means, responsive to an output of the motion detection means, for causing the shutter control to assert the first signal when a relative positional change has been detected.

4. The scanning system of claim 3, wherein the motion detection means further includes resolution-increasing means for increasing resolution of the position encoder, the triggering means being responsive to an output of the resolution-increasing means.

5. The scanning system of claim 4, wherein the resolution-increasing means includes extrapolation means for increasing the resolution of the position encoder, the extrapolation means including:
 means for measuring a time interval between previous encoder marks; and means for generating extrapolator counts at a frequency that is the inverse times a constant of the measured time interval, the extrapolator counts being supplied to the triggering means.

6. The scanning system of claim 5, wherein extrapolation is performed at each mark from the encoder.

7. The scanning system of claim 3, wherein the triggering means includes a counter for counting a number of marks from the motion detection means, each mark representing an increment in relative motion, the counter causing the shutter control means to assert the first signal when the number of marks counted reaches a threshold; and wherein the exposure control further includes means for dithering the number of extrapolator counts counted to achieve a fractional transfer gate length, the transfer gate length representing the number of extrapolator counts in a pixel.

8. The scanning system of claim 3, wherein the photodetector includes at least two rows of photodetector elements, the rows being spaced apart by a fixed distance; and wherein the triggering means includes a shutter control for each row of photodetector elements and a counter for each shutter control, each counter counting a number of marks from the motion detection means, each mark representing an increment in relative motion, each counter causing its associated shutter control means to assert the first signal when the number of extrapolator counts counted reaches a threshold; and wherein the exposure control further includes means for staggering initial counts in the counters to achieve registration of the two rows of photodetector elements.

9. The scanning system of claim 3, further comprising an amplifier responsive to an output of a row of photodetector elements; and a gain compensation control for reducing gain of the amplifier when exposure time is greater than a target value and for increasing the amplifier gain when measured exposure time is below a target value.

10. The scanning system of claim 9, further comprising a light source and a servo control for compensating for intensity and spectrum drifts in the light source, the servo control also adjusting the amplifier gain.

11. The scanning system of claim 1, further comprising a dc motor and transmission for moving the photodetector relative to a scanning surface; and a dc motor control, the motion detection means detecting the motion of the photodetector relative to the scanning surface.

12. The scanning system of claim 1, further comprising a dc motor, a transmission and a sheet feeder for moving a sheet relative to the photodetector; and a dc motor controller, the motion detection means detecting the motion of the sheet relative to the photodetector.

13. An optical scanner comprising:
multiple rows of photodetector elements for detecting multiple color planes of an image;
a dc motor drive system;
a position encoder responsive to the dc motor drive system; and
an exposure control, responsive to positional information generated by the position encoder, for starting and stopping exposure time of each row of photodetector elements, the exposure control including
a shutter control for each row of photodetector elements;
a triggering circuit for each shutter control; and
extrapolation means, responsive to marks from the position encoder, for increasing resolution of the position encoder, the extrapolation means generating a plurality of extrapolation counts at a frequency that is greater than the frequency at which the position encoder marks are being generated,
each triggering circuit being responsive the extrapolation counts and triggering its associated shutter control when the number of extrapolation counts have indicated that a specified distance has been traversed.

14. The scanner of claim 13, wherein each triggering circuit includes a counter for counting the extrapolation counts, and wherein the exposure control further includes dithering means for each of the counters, each dithering means dithering the number of extrapolator counts counted to achieve a fractional transfer gate length, the transfer gate length representing the number of extrapolator counts in the specified distance.

15. The scanner of claim 13, wherein each triggering circuit includes a counter for counting the extrapolation counts; and wherein the exposure control further includes means for staggering initial counts in the counters to achieve registration of the rows of photodetector elements.

16. The scanner of claim 13, further comprising an amplifier for each row of photodetector elements; and gain compensation controls for reducing gains of the amplifiers when exposure time is greater than a target value and for increasing the amplifier gains when measured exposure time is below a target value.

17. The scanner of claim 16, further comprising a light source and a servo control for compensating for intensity and spectrum drifts in the light source, the servo control also adjusting the amplifier gains.

18. A circuit for controlling photodetector exposure times in an optical scanning system, the system including a photodetector having a plurality of channels and an encoder, an output of the encoder providing a plurality of encoder marks, the circuit comprising:
a shutter control for each of the channels;
a triggering circuit for each of the shutter controls; and
extrapolation means, responsive to the marks from the encoder, for increasing resolution of the encoder, the extrapolation means generating a plurality of extrapolation counts at a frequency that is greater than the frequency at which the encoder marks are being generated;
each triggering circuit being responsive the extrapolation counts and triggering its associated shutter control when the number of extrapolation counts have indicated that a specified distance has been traversed.

19. The circuit of claim 18, wherein each triggering circuit includes a counter for counting the extrapolation counts, and wherein the circuit further includes dithering means for each of the counters, each dithering means dithering the number of extrapolator counts counted to achieve a fractional transfer gate length, the transfer gate length representing the number of extrapolator counts in the specified distance.

20. The circuit of claim 18, wherein each triggering circuit includes a counter for counting the extrapolation counts; and wherein the circuit further includes means for staggering initial counts in the counters to achieve registration of the channels of the photodetector.

21. The circuit of claim 18, wherein the scanner further includes an amplifier for each channel; and wherein the circuit further comprises a gain compensation control for each amplifier, each gain compensation control reducing an associated amplifier gain when exposure time is greater than a target value and for increasing the associated amplifier gain when measured exposure time is below a target value.

22. The circuit of claim 21, wherein the scanner further includes a light source, and wherein the circuit further includes a servo control for compensating for intensity and spectrum drifts in the light source, the servo control also adjusting the amplifier gains.

* * * * *